(12) United States Patent
Finberg

(10) Patent No.: US 10,083,240 B2
(45) Date of Patent: Sep. 25, 2018

(54) METHOD OF DATA ORGANIZATION AND DATA SEARCHING FOR CONSTRUCTING EVIDENCE-BASED BELIEFS WITHIN A SOCIAL NETWORK

(71) Applicant: Noah Finberg, Boston, MA (US)

(72) Inventor: Noah Finberg, Boston, MA (US)

(73) Assignee: CONSIDDR INC., Boston, MA (US)

( * ) Notice: Subject to any disclaimer, the term of this patent is extended or adjusted under 35 U.S.C. 154(b) by 0 days.

(21) Appl. No.: 15/557,486

(22) PCT Filed: Apr. 24, 2017

(86) PCT No.: PCT/US2017/029053
§ 371 (c)(1),
(2) Date: Sep. 12, 2017

(87) PCT Pub. No.: WO2017/189392
PCT Pub. Date: Nov. 2, 2017

(65) Prior Publication Data
US 2018/0121554 A1 May 3, 2018

Related U.S. Application Data

(60) Provisional application No. 62/328,216, filed on Apr. 27, 2016.

(51) Int. Cl.
*G06F 17/30* (2006.01)

(52) U.S. Cl.
CPC .. *G06F 17/30867* (2013.01); *G06F 17/30973* (2013.01); *G06F 17/30991* (2013.01)

(58) Field of Classification Search
CPC ......... G06F 17/30867; G06F 17/30973; G06F 17/30991
USPC ........................................................ 707/728
See application file for complete search history.

(56) References Cited

U.S. PATENT DOCUMENTS

| | | |
|---|---|---|
| 2013/0282814 A1 | 10/2013 | Marcucci et al. |
| 2014/0072947 A1 | 3/2014 | Boguraev et al. |
| 2014/0137001 A1 | 5/2014 | Baldwin et al. |
| 2016/0063381 A1 | 3/2016 | Allen et al. |

FOREIGN PATENT DOCUMENTS

WO    2015089648 A1    6/2015

*Primary Examiner* — Joshua Bullock
(74) *Attorney, Agent, or Firm* — Jeffrey Joyce, Esq.

(57) ABSTRACT

A computer implemented method to develop well formulated beliefs within a social network, the beliefs being based on arguments and evidence that are associated with a given question, and the method structuring and storing data in a manner that enables the method to suggest logically relevant arguments to augment a user's underlying belief.

18 Claims, 17 Drawing Sheets

FIG. 3

22 - QUESTION OBJECT:
    22A - Text String Question
    22B - List of Argument Objects
    22C - Numerical Influence Score
    22D - Merged Question Set

FIG. 8A

24 - ARGUMENT OBJECT:
    24A - Text String Argument
    24B - List of Argument Quotes
    24C - Link(s) to Evidence Object(s)
    24D - Merged Argument Set

FIG. 8B

26 - EVIDENCE OBJECT:
    26A - Text String Evidence Summary
    26B - Evidence

FIG. 8C

28 - MERGED QUESTION OBJECT:
    28A - Link to or Copy of Question 1
    28B - Link to or Copy of Question 2
    28C - Numerical Question Similarity Measure

FIG. 8D

29 - MERGED ARGUMENT OBJECT:
    29A - Link to or Copy of Argument 1
    29B - Link to or Copy of Argument 2
    29C - Numerical Argument Similarity Measure

METHOD OF DATA ORGANIZATION AND DATA SEARCHING FOR CONSTRUCTING EVIDENCE-BASED BELIEFS WITHIN A SOCIAL NETWORK

BACKGROUND INFORMATION

Field of the Invention

The invention relates to social media networks, search engines, and methods for crowdsourcing, aggregating, and storing information to assist users in forming reasoned and well-informed beliefs.

Discussion of Prior Art

Humans have very limited cognitive capacity, with the average individual's working memory being capable of processing approximately, seven units of information at a time. In addition, without repetition and/or attempts to retain new information, it is theorized that the average human forgets approximately 40 percent of new information within nineteen minutes, 55 percent within one hour, and 75 percent within two days.

While a person's inability to process and retain new information is not new, this limitation has become a significantly greater issue in today's data and information driven world. In particular, this inability for humans to process and subsequently retain information makes it very difficult to develop well-formed and carefully deliberated beliefs. Instead, most people's opinions more closely resemble emotional convictions rather than informed and reasoned beliefs, and the few reasons that people pull from their memory to support those opinions are often little more than rationalizations for how they already feel.

Furthermore, when an individual deliberates about issues, the few thoughts that he or she recalls from long-term memory are systematically biased by affect. As a result, people tend to reject arguments and evidence that do not comport with their initial feelings regardless of how valid those arguments and evidence may be. In short, the average person is plagued by an uncontrollable, emotionally driven tendency to engage in motivated reasoning.

The format that information typically comes in, for example, articles, television segments, books, radio programming, etc., also makes it very difficult to be deliberative in forming beliefs, as people tend to read and listen passively—and there is no easy way to compare, contrast, and synthesize arguments made across different sources and even different mediums. As a result, the arguments and evidence to which individuals are exposed, and potentially store in memory, are arbitrary at best and systematically biased at worst. Modern technology, and the Internet in particular, exacerbate these problems by radically increasing the amount of information available on virtually any topic.

What is needed, therefore, is a method of organizing data, storing data, and searching that data in a manner that helps people consider arguments from all relevant perspectives and form beliefs rooted in evidence.

BRIEF SUMMARY OF THE INVENTION

The invention is a computer implemented method that operates within a social networking system to organize, and store user entered data in a format that enables the user to develop well-reasoned, evidence-based, beliefs, and, based on the format of data and user interactions, the method suggests influential arguments and evidence that may assist the user in improving his/her existing beliefs or in developing new beliefs.

More specifically, the method enables users in the social networking system to break down all types of information into a standard format that is based on questions, arguments, and evidence, stores that information in a user-accessible data store, and enables the user to use that reformatted information to construct belief trees, which are structures for visualizing beliefs, and allows the user to continually update those beliefs with relevant information. Additionally, the method saves the reformatted data, and based on, that formatted data the method generates suggested arguments and evidence that may assist a user in creating or developing a belief tree based on how influential certain questions, arguments, and evidence are to the other users in the social networking system.

The method allows the user to easily collect and visualize an extraordinary amount of information in the form of questions, arguments, and evidence, and provides a mechanism to assimilate this information into a well-reasoned and well-supported belief or set of beliefs that are based on arguments and their supporting evidence. Additional questions, arguments and/or evidence may then be added to this initial set of arguments and evidence, allowing the user to assimilate new pieces of information, to consistently deliberate about issues of interest, and to continually help the user improve his/her existing beliefs.

The way the method stores the data, i.e. in associated objects comprising questions, arguments, and evidence, enables the method to perform an intelligent search, process referred to as logical aggregation, which allows the user to search for a topic or question of interest and receive a list of arguments that address that topic or question, with each argument containing its supporting evidence, which have been influential to other users in the social network.

Overall the method provides a mechanism within the social networking system for end-to-end information processing. Initially, a user is able to search for topics of interest. The search may be performed on the internet in general, with relevant sources of information imported into the social networking system. Or, a user may search the social networking systems data store for questions, arguments and evidence that has been identified and imported by other users. A user interface is provided to allow the users to synthesis the data that their searches reveal, and then to format that data into a well-reasoned belief that is based on arguments that are supported by evidence.

BRIEF DESCRIPTION OF THE DRAWINGS

The present invention is described with reference to the accompanying drawings. In the drawings, like reference numbers indicate identical or functionally similar elements. The drawings are not drawn to scale.

FIG. 3 is an example user interface page illustrating a user's workspace within the social network.

FIG. 8A is a block diagram illustrating the question object according to an embodiment of the invention.

FIG. 8B is a block diagram illustrating the argument object according to an embodiment of the invention.

FIG. 8C is a block diagram illustrating the evidence object according to an embodiment of the invention.

FIG. 8D is a block diagram illustrating the merged question object according to an embodiment of the invention.

FIG. 8E is a block diagram illustrating the merged argument object according to an embodiment of the invention.

FIG. 15 illustrates an example logical aggregation search result interface page.

DETAILED DESCRIPTION OF THE INVENTION

The present invention will now be described more fully in detail with reference to the accompanying drawings, in which the preferred embodiments of the invention are shown. This invention should not, however, be construed as limited to the embodiments set forth herein; rather, they are provided so that this disclosure will be complete and will fully convey the scope of the invention to those skilled in the art.

The invention is a computer-implemented method 100 for organizing data and searching data in a manner that enables users to develop well-informed evidence-based beliefs within a social networking system 1000. The method also enables the sharing of those beliefs, along with the arguments and evidence that support the beliefs, with other users in the social networking system 1000 to enable all users within the social networking system 1000 to develop better and more carefully considered beliefs.

Figure 1:
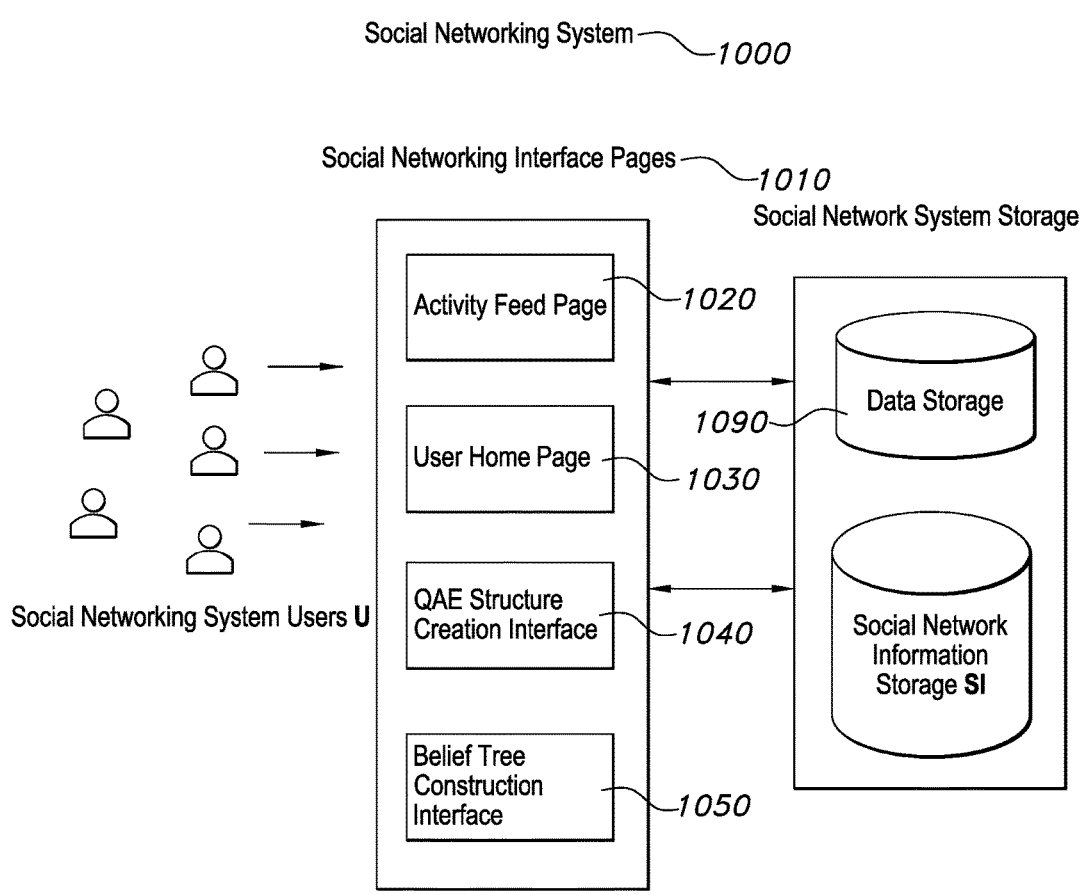
FIG. 1 is a high-level block diagram illustrating the exchange of information and creation of user beliefs in a social networking system, in accordance with an, embodiment of the invention.
Figure 2:
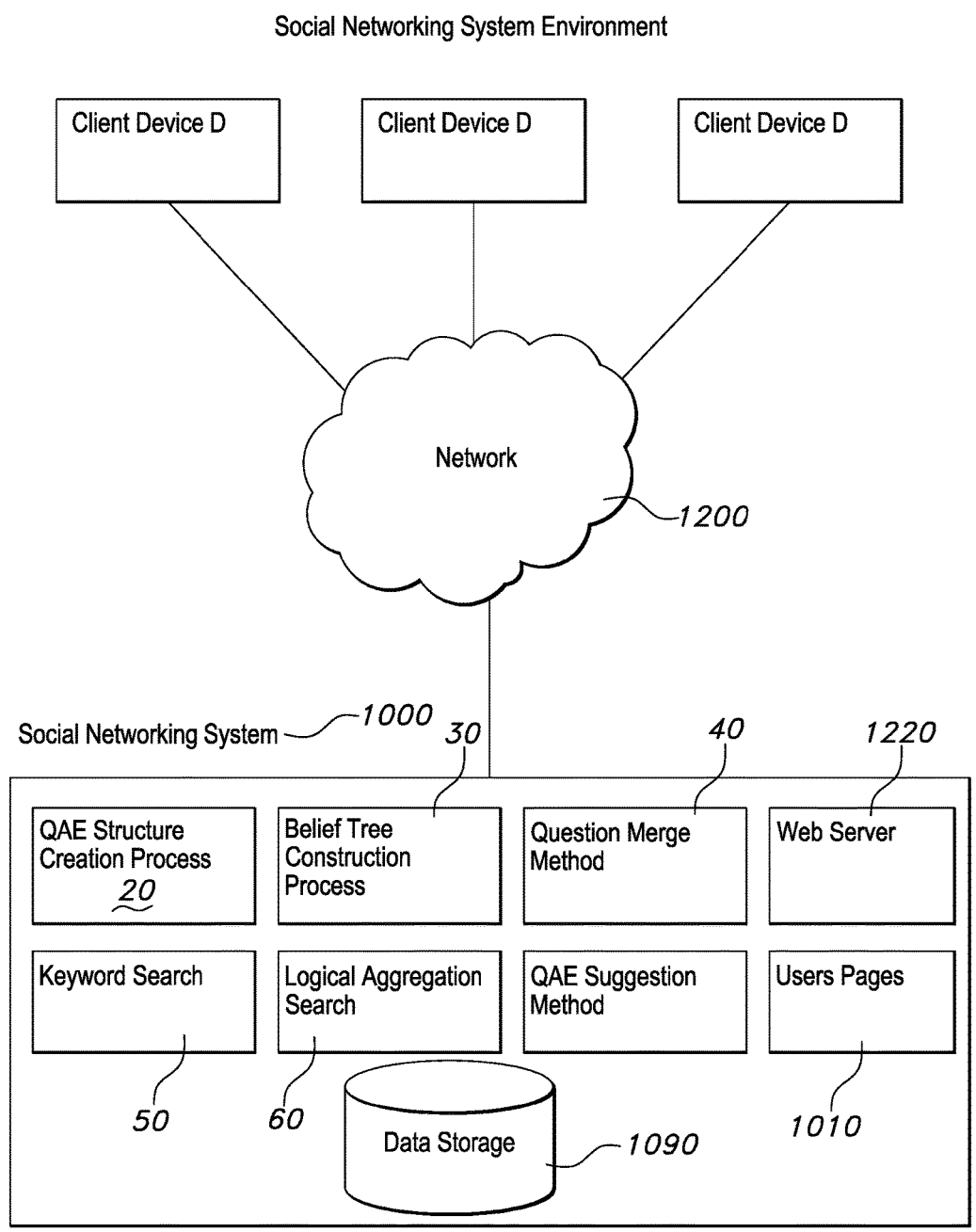
FIG. 2 is a network diagram of a system for creating beliefs in a social networking system.

FIGS. 1 and 2 illustrate the social networking system 1000. In general, the social networking system 1000 allows users U to join the network and interact with other users U through a series of interconnected, pages, that are generally viewable through a web browser or mobile device application on a client device D, such as a smart phone, tablet or computer. Social networking system information SI is typically tracked and stored as a social graph, which includes a plurality of nodes that are interconnected by a plurality of edges. The nodes commonly represent objects in the network and may act or be acted upon, and the edges commonly represent a connection or interaction between two nodes. For example, two nodes may represent two users, and an edge between the two nodes may represent the users' connection in the social networking system 1000.

Within the social networking system 1000 each user has a set of social networking system interface pages, also referred to as user interface pages 1010, that allow him or her to, among other activities, construct question-argument-evidence ("QAE") structures 10, build belief trees 30, perform a keyword search 50 of data stored in the social networking system 1000, search for arguments that have been influential to other users through a logical aggregation search process 60, view and consider question-argument-evidence ("QAE") suggestions 70, have a Socratic dialogue 80 with other users to mutually develop well-reasoned and better informed beliefs, and to view activity related to other users, i.e. the QAE Structures 10 that they are considering or the belief trees 30 that they are formulating, in an activity feed interface page 1020.

Users add data to the network in the form of the QAE Structures 10, each of which includes of a question 12, one or more argument summaries 14 and one or evidence summaries 16. The QAE Structures 10 are then used to create the belief trees 30, which include a belief summary 32 and one or more QAE Structures 10 that support the belief summary 32. The belief summary 32 is a user created summary of a belief that is based on the underlying OAF structures. As users develop QAE Structures 10 and belief trees 30 the underlying data, i.e. the question, arguments, evidence, are saved to a data store 1090 in the format of the QAE Structures 10.

Figure 3:
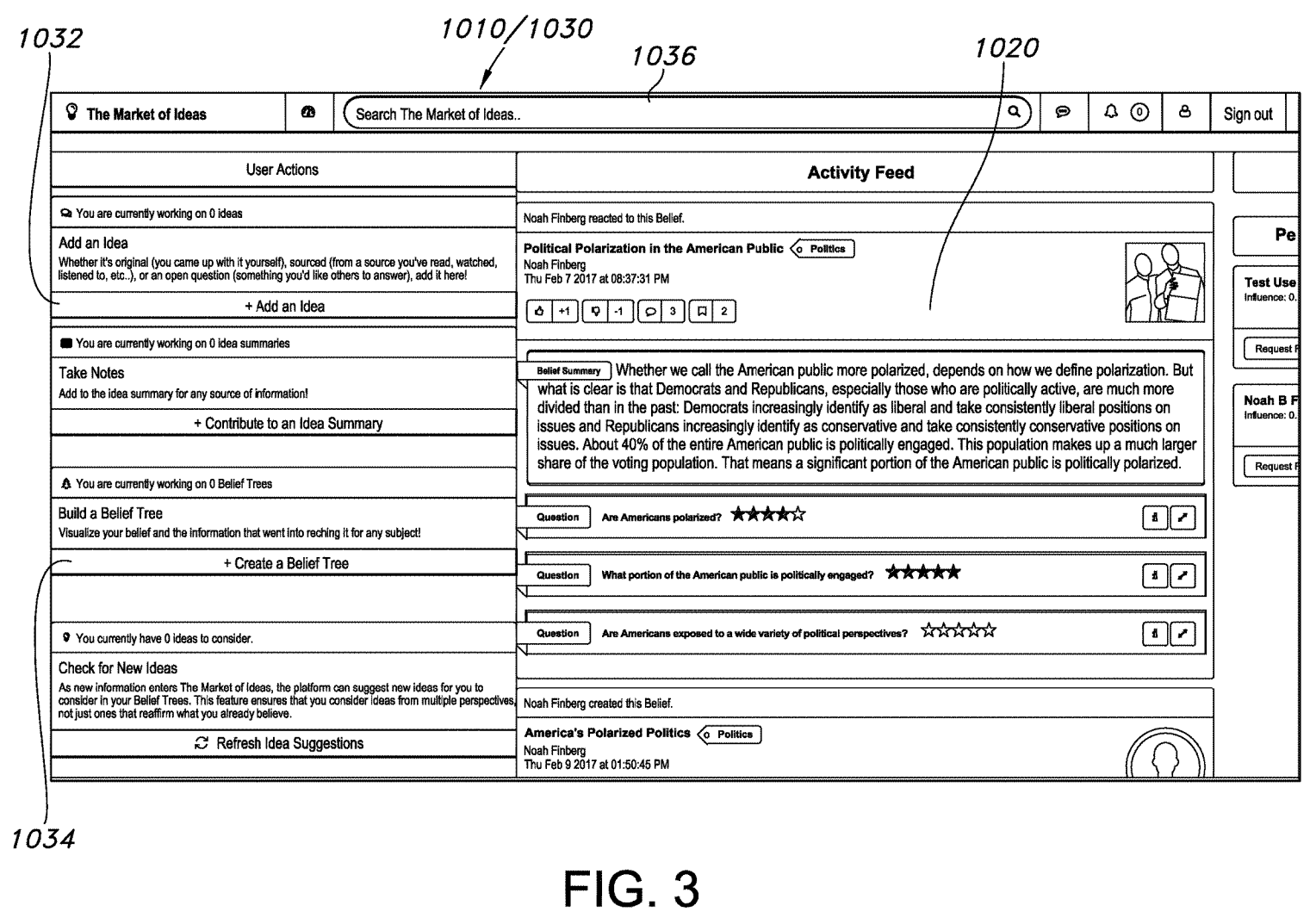
Figure 4:
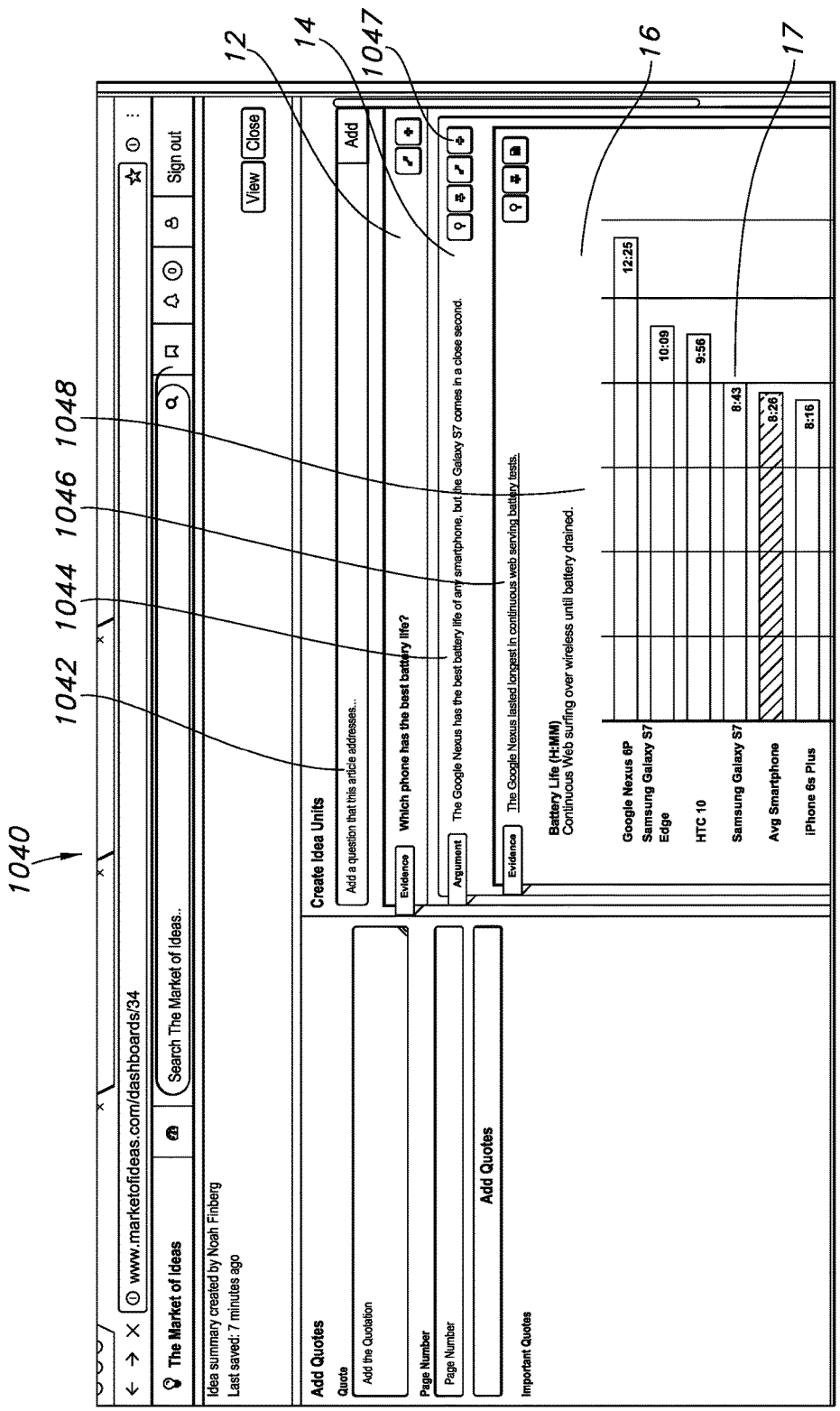
FIG. 4 is an example user interface page illustrating the QAE Structure creation process.
Figure 5:
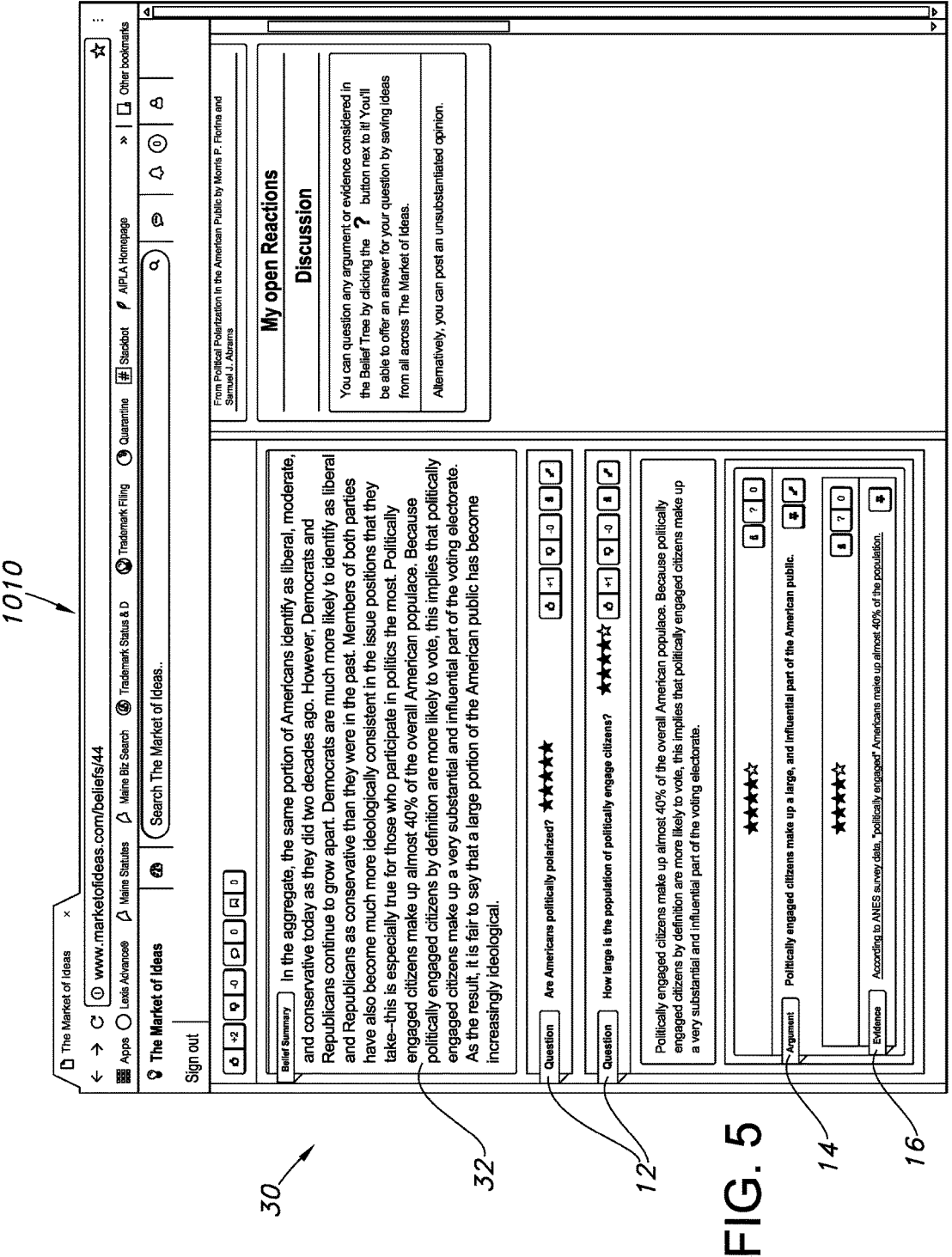
FIG. 5 is an example graphical user interface illustrating a basic belief tree.

FIG. 3 is an example of a user home page 1030 having a QAE Structure creation button 1032 for creating a QAE Structure 10, a belief tree creation button 1034 for creating a belief tree 30, and a search field 1036 for conducting a keyword search 50 or logical aggregation search 60 of the data store 1090. The activity feed 1020 is also shown. Selecting the QAE Structure creation button 1032 takes the user to a QAE Structure creation interface page 1040, an example of which is illustrated in FIG. 4, that includes text entry boxes for entering questions 1042, argument summaries 1044, evidence summaries 1046, and options 1047, 1038 for attaching argument quotes 15, and evidence samples 17. A question 12, argument summary 14, and evidence summary 16 and evidence sample 17 are also shown. FIG. 5 is an example of a belief tree 30, showing the belief summary 32 and two questions 12, with one of the questions expanded to show the associated argument summary 14 and evidence summary 16.

Figure 6:
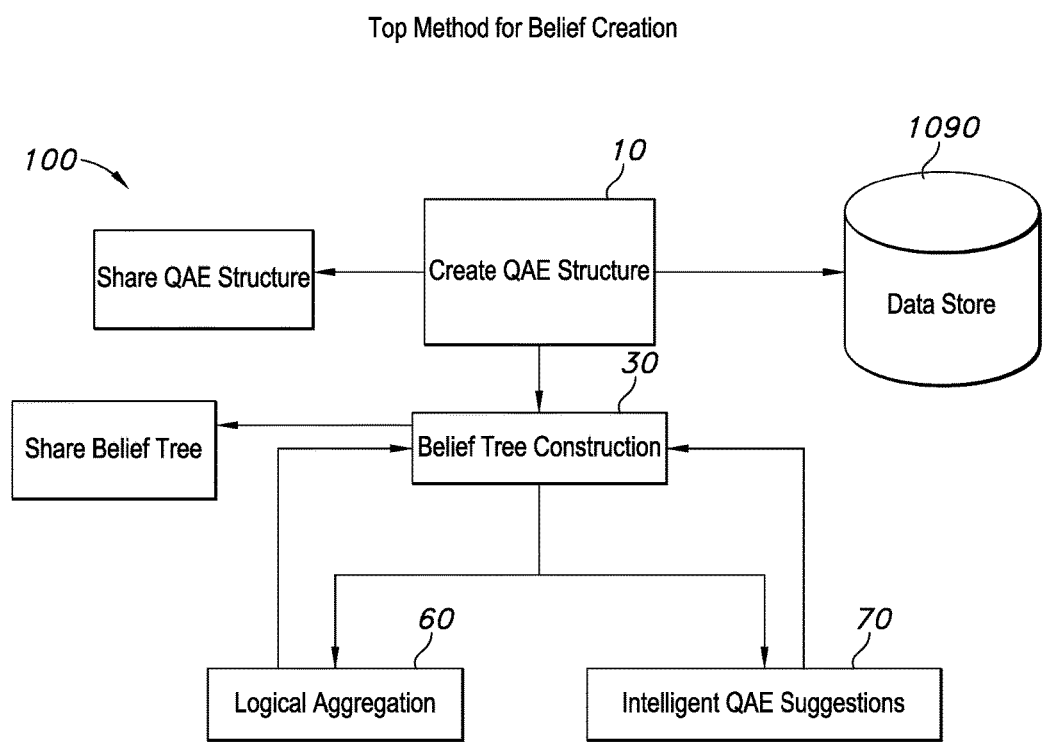
FIG. 6 is a block diagram of the top-level method of belief creation according to an embodiment of the invention.

FIG. 6 is a high-level block diagram of the method 100 according to the invention showing the topology of the software architecture, the sub-methods within the software architecture, and the relationship between those sub-methods, particularly comprising the creation of a QAE Structure 10, populating a data store 1090 with the data from the QAE Structures 10, creating belief trees 30, and generating logical aggregation search results 60 and QAE suggestions 70 based on the QAE Structure data in the data store 1090 and both a particular user's interactions, i.e. searching for question or creating a new QAE structure, and the other social networking systems users interactions, i.e. adding new question, argument and evidence or using the question, argument and evidence created by others, within the social networking system 1000. The data store 1090 may be any suitable medium for storing data, such as a relational database.

QAE Structures 10 may be added to the set of user pages 1010 in a number of ways. One way for users to add a QAE Structure is with the QAE Structure creation process 20, which is illustrated by the block diagram shown in FIG. 7 and by the QAE Structure creation page that is illustrated in FIG. 4. As previously mentioned, a QAE Structure 10 is comprised of a question 12, an argument summary 14 and evidence summary 16.

To create a QAE Structure 10, a user identifies source material 18, which is, generally, a source of information that contains arguments and/or some evidence that appears pertinent to a topic of interest. The social networking system 1000 allows the user to use source material 18 from any suitable medium, such as, for example, written articles, blog posts, video segments and/or audio clips. The source material 18 may be found on the Internet, in which case it may be added to the user pages 1010 in a number of conventional ways, such as, for example, through the use of cutting and pasting tools that are available on most computer and mobile device platforms or through manual data entry. The source material 18 may also come from sources outside of the internet and other digital mediums, such as printed materials or presentation at a lecture or during a conference, through the manual data entry into the text entry boxes 1042, 1044, 1046.

The user uses the source material 18 to create a question 12 by entering text in the question dialog box 1042 that presents the topic or idea that the source material 18 is addressing. The user adds an argument summary 14 to the argument dialog box 1044, which may be a summary of the arguments the source material 18 is making or, if appropriate based on the context of the source material 18, it may be a direct quote from the source material 18. The user may also optionally add argument quotes 15 by cutting and pasting pertinent passages directly from the source material 18. If the source material 18 includes specific evidence, such as, for example, a chart or graph that shows test results, the user creates an evidence summary 16 and adds the evidence, either by copying it from the source material 18, uploading an image such as a screenshot, adding evidence quotes, or manually entering it. The question 12, arguments 14, and evidences 16 may be entered in any order and the method 100 also allows the creation of questions without, or with empty, arguments or evidence.

For example, a user wishes to decide which smartphone is the best phone for a particular purpose, such as battery life or processing speed. While on a consumer review website the user finds an article that discusses the best smartphones, and particularly those that have the best battery life, and that includes a number of charts showing how long each phones battery lasts under a particular set of situations, i.e. sending emails or streaming video. In a separate browser window the user accesses the social networking system 1000 and then accesses the QAE Creation Interface Page 1040. The user then creates a question that summarizes the topic of the article, such as "which smart phone has the best battery life?", and enters the text in the question dialog box 1042. The user then adds a summary of the argument in the argument dialog box 1044, such as "The Google Nexus has the best battery life of any smartphone, but the Galaxy S7 comes in a close second", and then the user optionally attaches argument quotes by cutting and pasting the text from the article itself. Finally, the user enters a summary of the evidence into the evidence summary dialog box 1046, such as "the Google Nexus lasted longest in continuous video streaming", and then attaches an image of the chart that includes the results of the battery test.

Users may also use the QAE Structure creation process 20 without source material 18. With this option, rather than add the arguments 14 and evidence 16 from source material 18, the user populates all of the fields based on his or her own questions 12, arguments 14, and evidence 16. This allows the user to manually enter information from non-digital sources, and also allows the user to post questions and arguments that others may add arguments and/or evidence too. A user may also save QAE Structures 10 that were created by other users in the social networking system 1000 to his/her own user interface pages 1010. Users may also merge, two or more questions together, as further explained in the following paragraphs.

Figure 7:
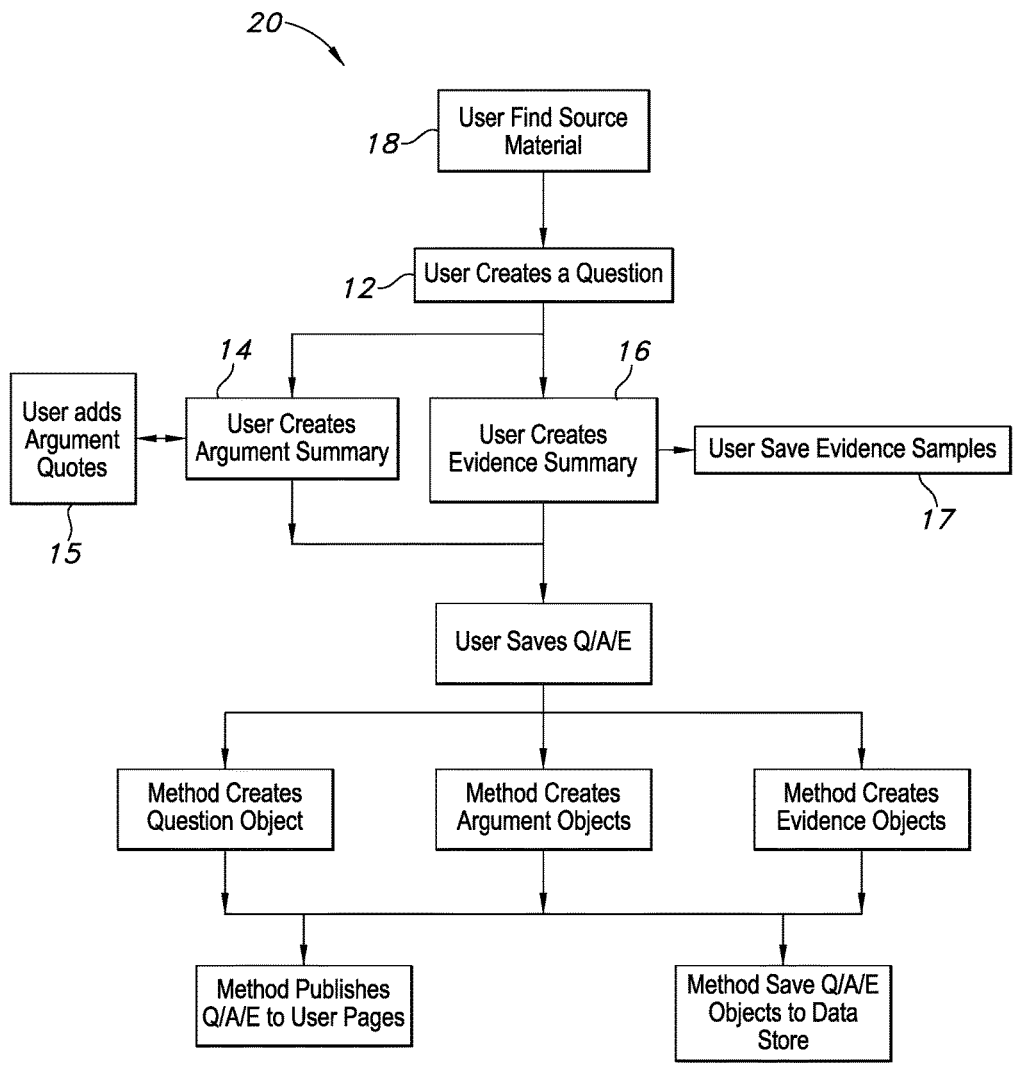
FIG. 7 is a block diagram of the QAE creation process.

When the user saves the QAE Structure 10 the method 100 creates a question object 22, argument objects 24, and evidence objects 26, and saves the objects to the data store 1090, as Illustrated in FIG. 7. The associations between the QAE Structure 10 and the objects 22, 24, 26 are tracked and maintained by the method 100.

FIGS. 8A-8C illustrate the objects 22, 24, 26. The question object 22 has a text string 22a that includes the question 12 from the text entry from the dialog box 1042, a list of argument objects 22b that includes a link to or a copy of each associated argument object 24, and an influence score 22c that measures how influential the question 12 is and that is initially set to 0 to indicate that it has not yet been influential. The question object 22 also includes a set of merged question objects 22d that contains a list or set of merged questions objects 28. The merged question objects 28, illustrated in FIG. 8D, contain question links or copies 28a, 28b, to a first question object 22 and a second question object 22 that have been merged together into a single structure, such as a belief tree 30, along with a question similarity measure 28c that tracks the number of times the two question objects 22 have been merged. Initially the set of merged question objects 22d in each question object 22 is empty.

The argument object 24 has a text string containing the argument 16 from the text, entry of the argument 24a, a quote list 24b containing any argument quotes 15, an evidence list 24c that includes links to or copies of any associated evidence object 26 or evidence objects 26, and a set of merged argument objects 24d that contains a list of merged argument objects 29. The merged argument objects 29 are similar in structure to the merged question objects 28 and contain argument links 29a, 29b to the argument objects 24 that have been merged and an argument similarity measure 29c that tracks the number of times the two argument objects 24 have been merged. The evidence object 26 includes the evidence summary 26a having the evidence summary 16 and evidence 26b that is the evidence 17. The objects 22, 24, 26, 28, and 29 are saved to the data store 1090.

Once a user has created or otherwise identified and saved one or more QAE Structures 10, the user is able to create belief trees 30. As previously mentioned, the belief trees 30 allow users to visualize what they believe and why they believe it because each tree 30 includes all of the questions, arguments and evidence that went, into forming the belief. As a result, the belief trees 30 are always rooted in substance and users are not left to rely on their memories and emotions when forming beliefs. Belief trees 30, like a user's actual beliefs, may also be updated over time.

Figure 9:
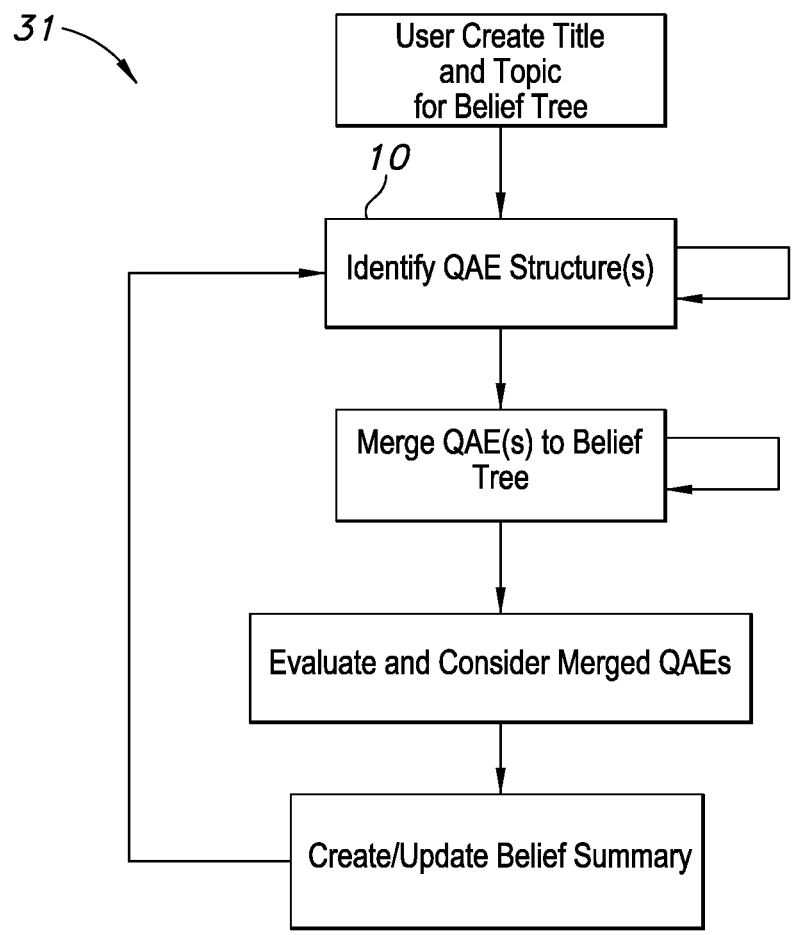
FIG. 9 is a block diagram of the belief tree construction creation process.
Figure 10:
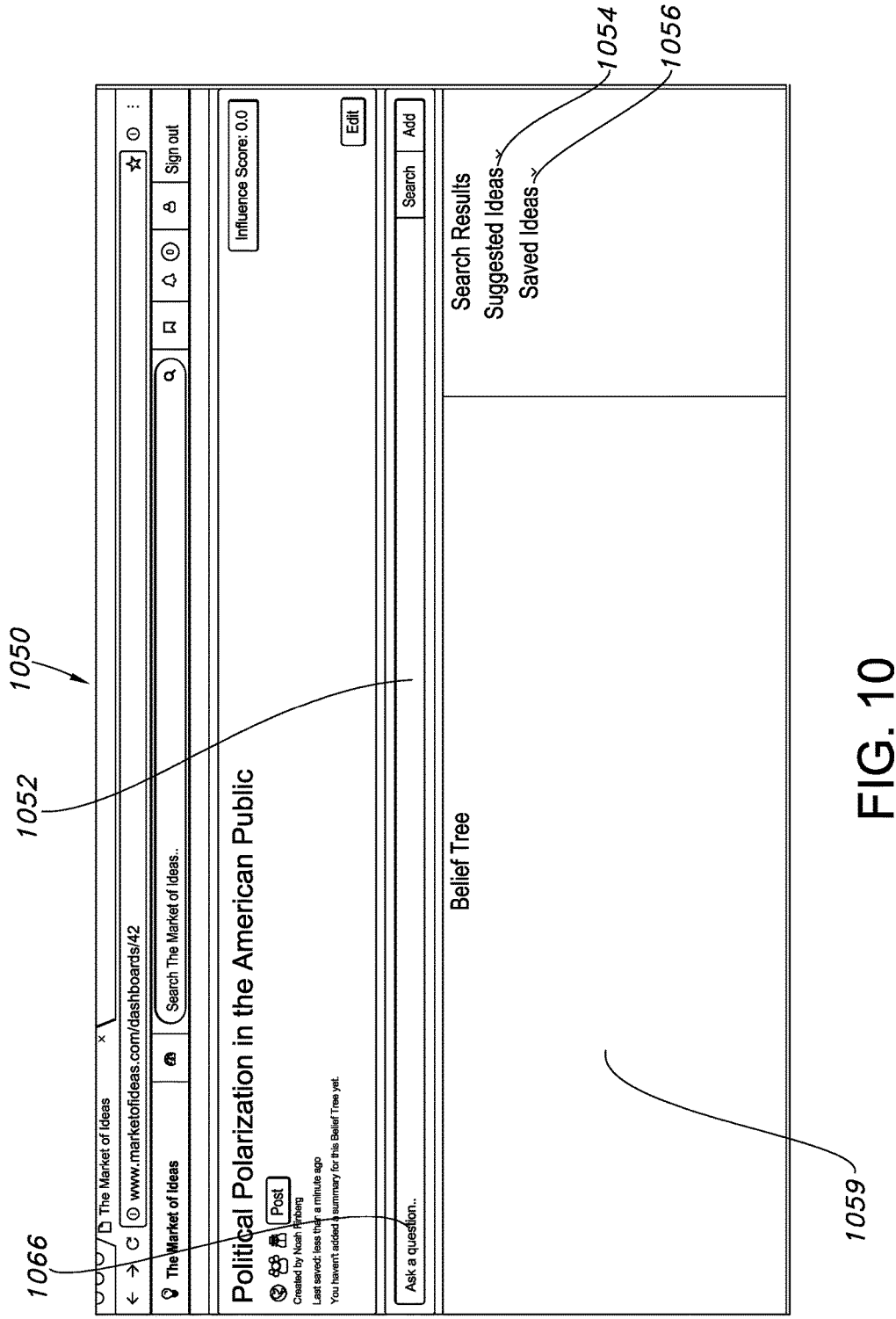
FIG. 10 is an illustration of example belief tree construction interface page before any questions have been added.
Figure 11:
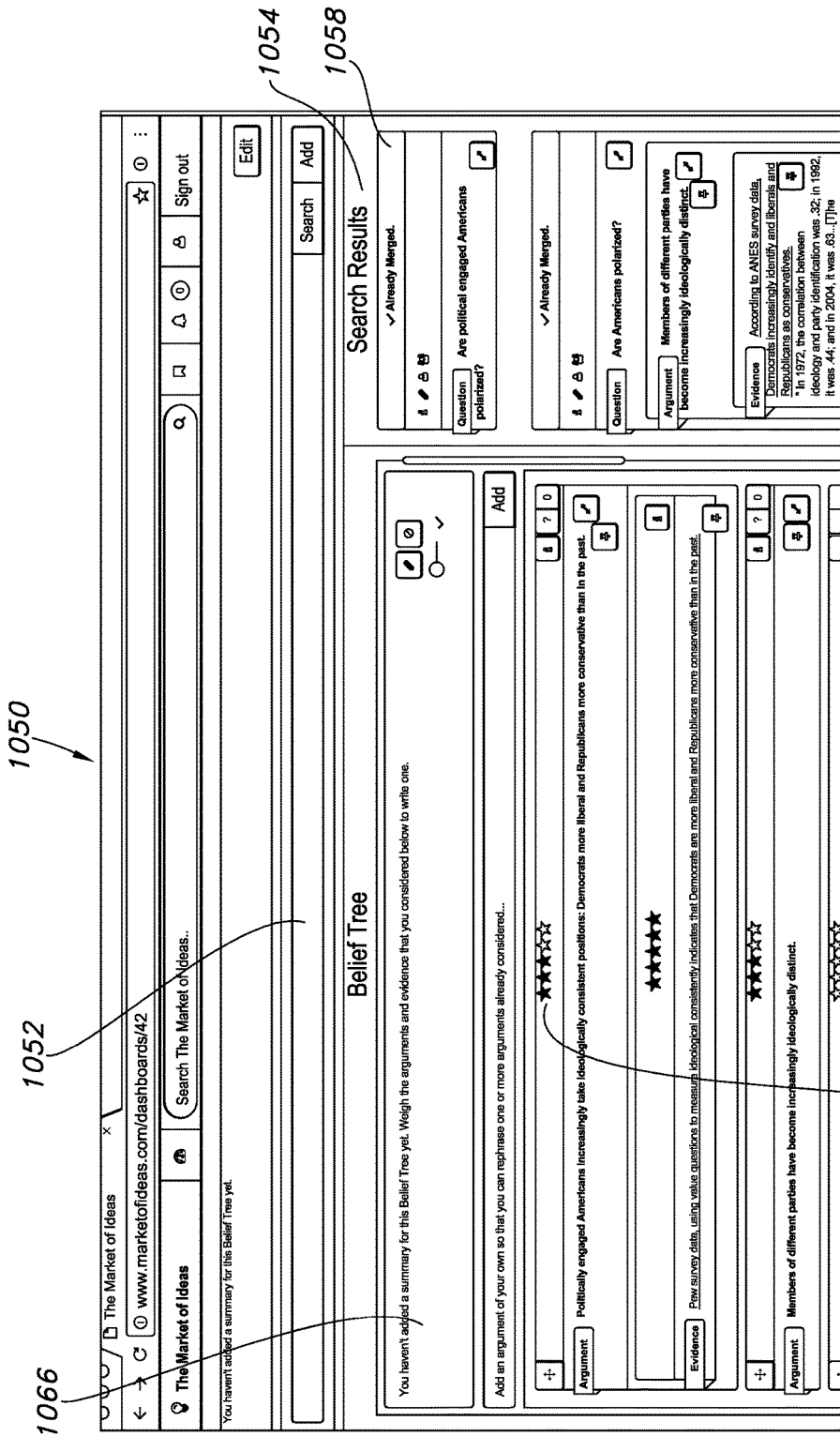
FIG. 11 is an example belief tree construction interface page showing a tree having questions added.

FIG. 9 is a block diagram that illustrates the belief tree construction process 31 and FIGS. 10 and 11 are illustrations of an example belief tree construction interface page 1050. The user first adds one or more questions 12 that she/he wishes to answer in the belief tree 30. Adding a question 12 to a belief tree 30 creates a question object 22 without any argument objects 24 or evidence objects 26. The user then finds one or more existing QAE Structures 10 that addresses the question or questions 12 in the belief tree 30. As previously mentioned, users may find and save QAE Structures 10 in several ways. The belief tree creation page 1050 includes a dialog box 1052 for searching the data store 1090, and a QAE Structure suggestion list 1054 that provides suggested QAE structures that are found in the data store 1090 through the QAE Suggestion method 70, and a saved QAE Structure list 1056 that displays the QAE Structures 10 that a user has previously saved and that are related, i.e. have similar key words, to the search topic. A merge button 1058 is provided to allow the user to easily merge any of the QAE Structures 10 into any question 12 in the belief tree 30. Merging the QAE structure 10 into the question 12 merges the objects 22, 24, 26, 28, 29, as described below, and increments that question objects 22 influence score 22c. Merged QAE Structures 10 are displayed in the belief tree creation window 1059.

Figure 12:
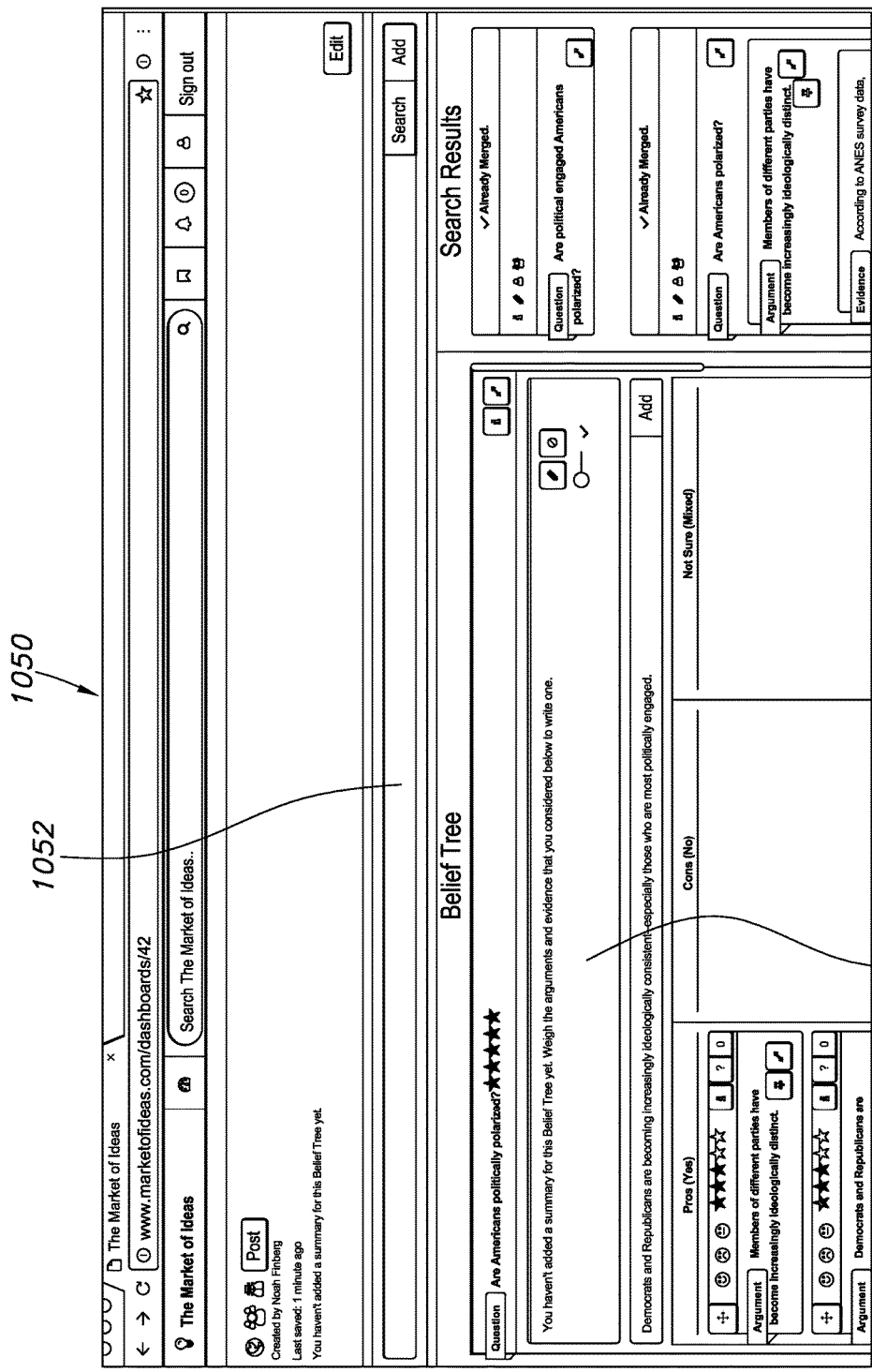
FIG. 12 illustrates the belief tree creation interface page showing a pro/con table.

In general, not all QAE Structures 10 are equally relevant or equally persuasive, and the belief tree creation interface page 1050 allows the user to indicate, a ranking option 1062 to add 1 to 5 stars to the QAE Structure 10 to indicate how relevant he/she found the QAE Structure 10, as well as to individual arguments 14 and evidence 16 in the belief tree 30. FIG. 12 illustrates a pro/con table 1064 within the belief tree creation page 1050 that allows the user to visualize, categorize and organize the various QAE Structures 10 to aide in his/her deliberation. Users may also type answers to individual questions. Once the user is satisfied that he/she has considered a sufficient number of questions he/she types or updates his/her belief summary 32 in to the belief creation dialog box by selecting the edit button 1067 and saves the belief tree 30. Saving a belief tree 30 publishes the belief tree 30 to the user's interface pages 1010, as shown in FIG. 5, and saves the belief tree 30 objects, i.e. the question objects 22, argument objects 24 and evidence objects 26, to the data store 1090.

For example, from the home screen illustrated in FIG. 3 the user may initiate the belief tree creation process 30 by selecting the belief tree creation button 1034. Selecting the belief tree creation button 1034 causes a dialog window (not shown) to appear prompting the user to enter a title, such as "Political Polarization in American Politics", and a topic, such as "Politics," Entering the title and topic takes the user to the belief tree creation page 1050 illustrated by FIGS. 10-12. Once on the belief tree creation interface page 1050 the user may search for QAE Structures 10 by, for example, entering search terms in the search window 1066. This keyword search 50 returns search results in the search results window 1058, and the list allows the user to expend each QAE Structure 10 to view their arguments 14 and evidences 1.

For example, searching for the keywords "are Americans politically polarized?" may return a number of QAE Structures 10, such as 1) Question: are Americans polarized?; Argument: Politically engaged Americans increasingly take ideologically consistent positions; evidence; quotes and charts from an article published by the Pew Research Centers; and 2) Question: Are Americans becoming more polarized?; Argument: members of different parties have become increasingly ideologically distinct; Evidence: ANES Survey Data.

The user considers each QAE Structure 10 and the underlying arguments 14 and evidence 16, and, after finding the QAE Structure 10 persuasive or, at least, relevant, uses the merge button 1058 to add the objects associated with the QAE Structure to a relevant question 12 or questions 12 in the belief tree 30.

Figure 13:
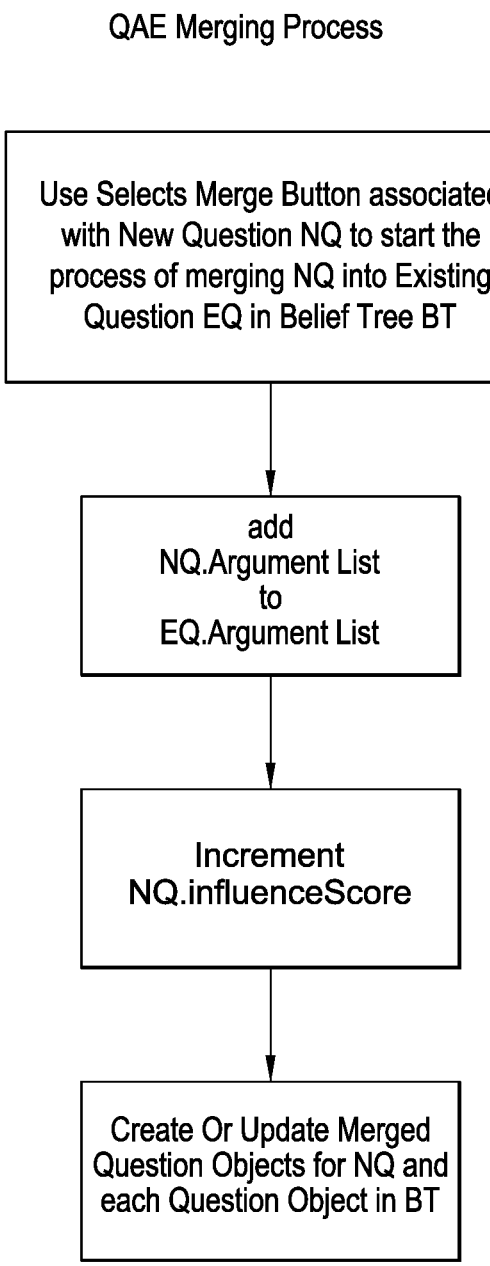
FIG. 13 is a high-level block diagram illustrating the QAE merging process.
Figure 14:
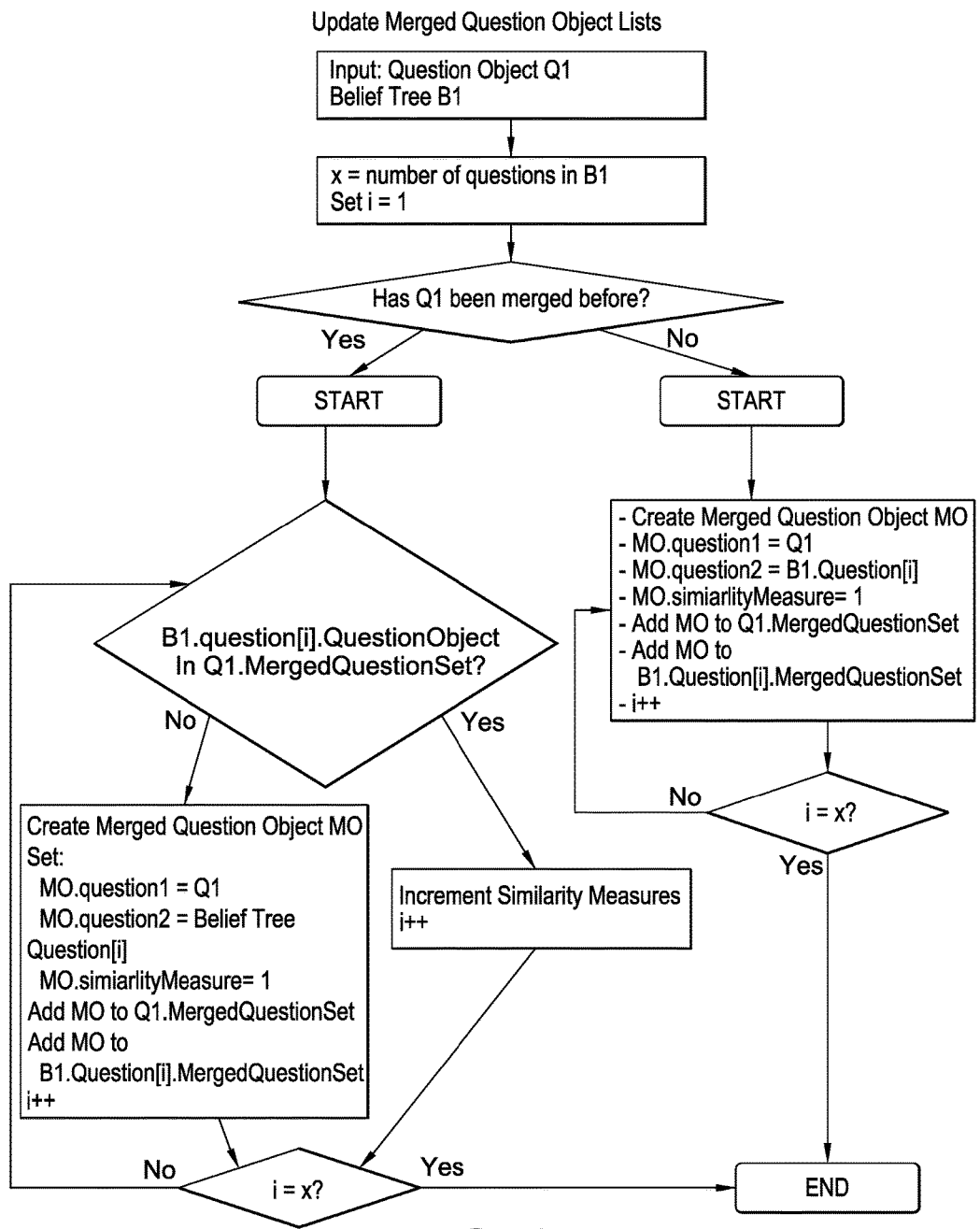
FIG. 14 is a block diagram for the process of creating or updating the merged question list(s) after a QAE structure has been merged.

FIGS. 13 and 14 are block diagrams that illustrate the merge method 40. The merge method 40 adds the data associated with a new question 42 to an existing question 44 in a belief tree 30 and increments the new question's 42 influence score. More specifically, the new question 42 is a question object 22 that was previously created and saved in the data store 1090 and has, a string 42a, argument object list 42b, influence score 42c, and a merged question set 42d. The existing question 44 is a question object 22 that the user had previously added to the belief tree 30 and has a string 44a, argument object list 44b, influence score 44c, and a merged question set 44d. The merge method 40 adds the argument objects 42b from the new question 42 to the existing question's 44 argument object list 44b.

The merge method 40 also updates the merged question sets 42d, 44d, for the new question 42 and the existing question 44, as well as for each question object 22 that had previously been merged with the existing question object 44. A question object 22 having a merged question set 22d that is empty indicates that the question object 22 has not previously been merged with other question objects 22. If the new question 42 has an empty merged question set 42d the merge method 40 creates new merged question objects 28 for the new question object 42 and the existing question object 44, and for the new question object 42 and each other question object 22 that had previously been merged with the existing question object 44. For example, if the existing question object 44 had been merged with 3 other question objects 22, a total of 4 merged question objects 28 are created, one merged question object 28 for each new pair of question objects 22 that are being merged for the first time. In each instance, the merged, question object 28 has links 28a, 28b to the two question objects 22 that are being merged, i.e. new question object 42 and existing question object 44, and the question similarity measure 28c that is initially set to 1. A link to, or copy of, the merged question object 28 is added to the merged question set 22d for each question object 22 that was merged, i.e. new question object 42 and existing question object 44.

If the new question's 42 merged question set 22d is not empty the merge method 40 iterates through the new question's 42 set, of merged question objects 42d to determine whether a merged question object 28 exists for the existing question 44 and/or any of the question objects 22 in the existing question object's 44 merged question set 44d, i.e. the method 40 checks if existing question 44 is included as either the first merged question object 28a or the second merged question object 28b in a merged question object 28. If a merged question object 28 does exist for a pair of the question, objects 22 its similarity measure 28c is incremented, for example, by one. If a merged question object 28 does not exist for a pair of question objects 22 a new object 28 is created with links 28a, 28b to the two question objects 22 and the similarity measure 28c is set to 1. The new merged question object 28 is added to each question objects 22 set of merged questions 22d. Merging the QAE Structure 10 into another question, and/or into a belief tree 30 also increments the question objects 22 influence score 22c by, for example, one.

Users may also merge argument objects 24 through a process similar to the question object merge method 40. For example, as the user reviews the arguments 14 associated with a question 12 in a belief tree 30, she/he may decide that some are similar and, therefore, not needed on their own. The user may drag one argument 14 on to the other argument 14 and the method 100 merges the two argument objects 24, 24 into a merged argument object 29. The merged argument object 29 has links, 24a, 24b, to the two argument objects 24 that are merged and an argument similarity measure 24c that counts the number of time two argument objects are merged. Only the original argument remains visible in the belief tree 30. If the argument objects 24 have been merged before the argument similarity measure 29c is incremented. If the arguments have not been merged before a new merged argument object 29 is created containing links 29a, 29b, to the two argument objects 24 and an argument similarity measure 29c that is initially set to 1. The merged argument object 29 is added to each argument object's 24 merged argument set 24d.

Once the user feels as though she/he has added enough QAE Structures 10 to the belief tree 30 she/he considers all of the arguments and evidence and types a belief summary 32 in to the creation entry field by selecting the edit button 1067. Using the previous political polarization example, a user may create a belief summary 32 such as "Democrats and Republicans continue to grow apart. Democrats are much more likely to identify as liberal and Republicans more conservative than they were in the past. Members of both parties have also become much more ideologically consistent in issue positions that they take—this is especially true for those who participate in politics the most." Once the user has constructed a satisfactory belief tree 30 he or she may post it to the social networking system 1000 for discussion or use by other users in the social networking system 1000.

As previously noted, as users construct CAE Structures 10 and belief trees 30 those structures along with the underlying data, i.e. the question objects 22, argument objects 24 and evidence objects 26 are saved to a data store 1090. Having a data store 1090 containing the objects 22, 24, 26, 28, 29, and belief trees 30 enables a number of search and suggestion methods.

The first search and suggestion method is a keyword search 50 of the information in the data store 1090, and in particular the question objects 22 text string 22a, arguments objects 24 argument summary 24a, and evidence objects 26 evidence summary 26a. When a user enters search terms into any of the search windows in the user interface pages 1010 the keyword search 50 lists similar question objects 22, argument objects 24, and evidence objects 26 that are in the data store 1090 based on similar keywords. There are several suitable known techniques and methods for performing this type of search. For example, MYSQL is a common open-source relational database management system that provides keyword search utilities. Additionally, there are several known open-source keyword search engines such as LUCENE and SPHIX.

Figure 16:
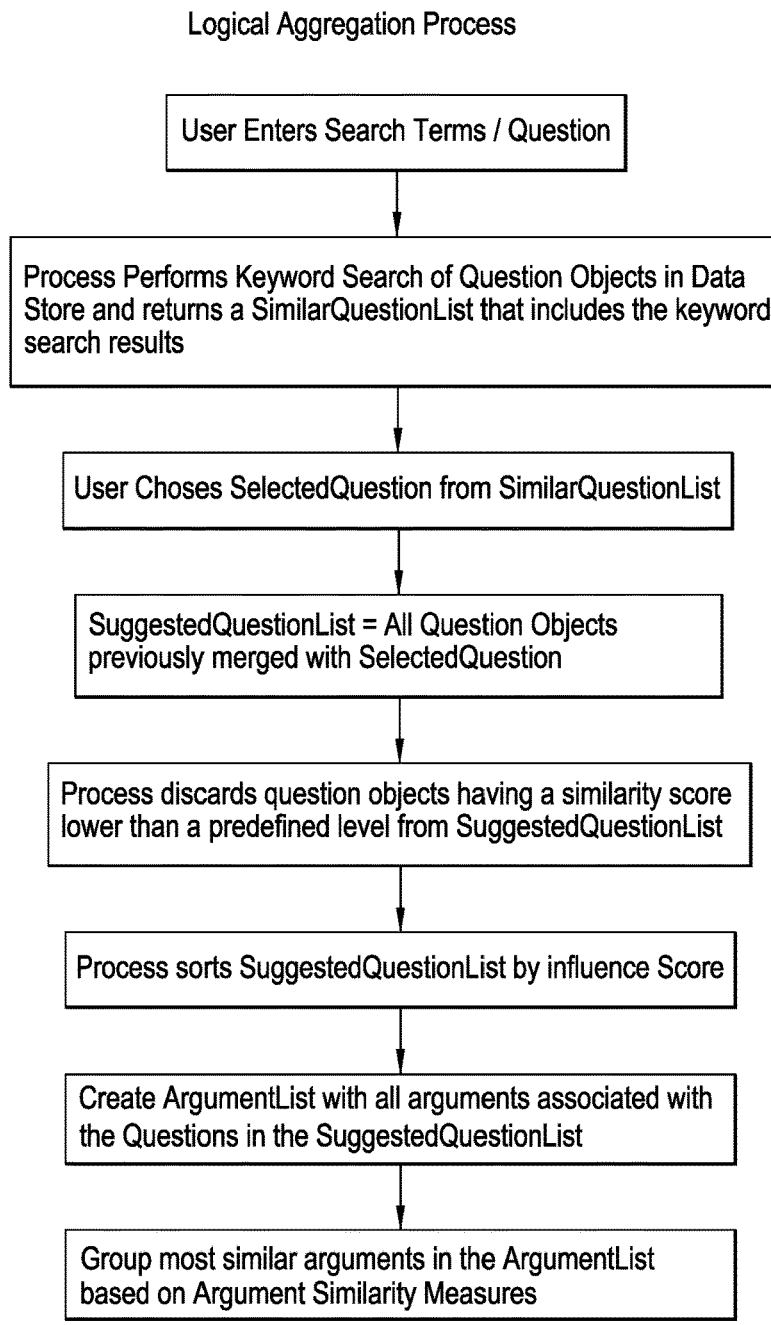
FIG. 16 is a block diagram illustrating the logical aggregation search process.

The second type of search and suggestion is logical aggregation 60, which is illustrated by the block diagram in FIG. 16. In response to a user's search request logical aggregation uses the structure of the data in the data store 1090 to identify similar question objects 22 that have been influential to other users, and returns argument objects 24 that are likely to be relevant and influential in answering the question that is being searched.

More specifically, a user enters a question or search terms into a search window on a user page 1010, for example, search window 1066, and the logical aggregation method 60 creates a similar question list 62 by performing a keyword search of the question objects 22 text strings 22a that are in the data store 1090. The user reviews the similar question list 62 and chooses a selected question 63 that is a question object 22 from the list 62 that appears relevant or interesting. The method 60 then creates a suggested question list 64 having all the question objects that the selected question object 63 has been merged with, i.e. those found in the merged question list 63d, 22d.

The method 60 sorts the suggested question list 64 using the merged question objects' 28 similarity measures 28c and influence score 22c. In one embodiment, the method 60 first removes all question objects 22 having similarity measure 22c that are below a cutoff level 67 from the suggested question list 64. The cutoff level 67 may be defined in a number of ways. For example, the cutoff level may be set to reject the lowest 25% of similar questions. Or, it may be set based on the number of similar questions, i.e. it may reject the bottom 25% if there are fewer than 100 similar questions, or bottom top 50% if there are more than 100 similar questions. The method 60 then sorts the suggested question list 64 by influence score 22c, i.e. with the first question having the highest influence score and the last question have the lowest influence score.

In other embodiments, the method 60 may sort the suggested question list 64 using a combination of the influence score and similarity measure weighting.

After the suggested question list 64 is sorted using the similarity measures and influence scores the method 60 creates an argument list 66 having all of the argument objects 24 that, the question objects 22 in the sorted question list 64 have been linked with, i.e. the argument objects 24 in the question objects list of argument objects 22B. The argument list 66 is then sorted by argument similarity measures 29C, with similar arguments, i.e. those having similarity measures above a predetermined level, being grouped together visually to avoid displaying repeated arguments to the user. For example, arguments that have been merged more than 10 times may, be grouped together.

The method 60 returns a list of the most influential and most relevant arguments from sources that address the question that was searched from, including the associated evidence. Other factors may also be used to sort the list, including, for example, date of creation and/or amount of discussion surrounding an argument.

The results returned by logical aggregation 60 are in stark contrast to those returned by traditional online search results. Using any common search engine such as GOOGLE or BING a user may enter key words to search the internet. The results of the search are a long list of links to that contain at least somewhat relevant information. However, to process this information a user must click each link, read the content, mentally process the content, and find some way to retain the retain the content. Logical aggregation 60, on the other hand, returns the list of arguments that are directly relevant to the question, while also including the underlying evidence that supports the argument.

For example, using a common online search engine to search for the words "which smartphone should I buy" returns links to websites having such titles as: 1) Best smartphones 2017; 2) iPhone 7, Samsung Galaxy S7 or Google Pixel?; 3) 10 Best smartphones in the US; 4) 10 Best Android phones 016: whish should you buy? While these sites likely include information that is relevant to the question, the user is no closer to forming a decision and must, engage in tedious process of clicking through each link, attempting to identify and extract useful information, and then process and retain that information.

Figure 15:
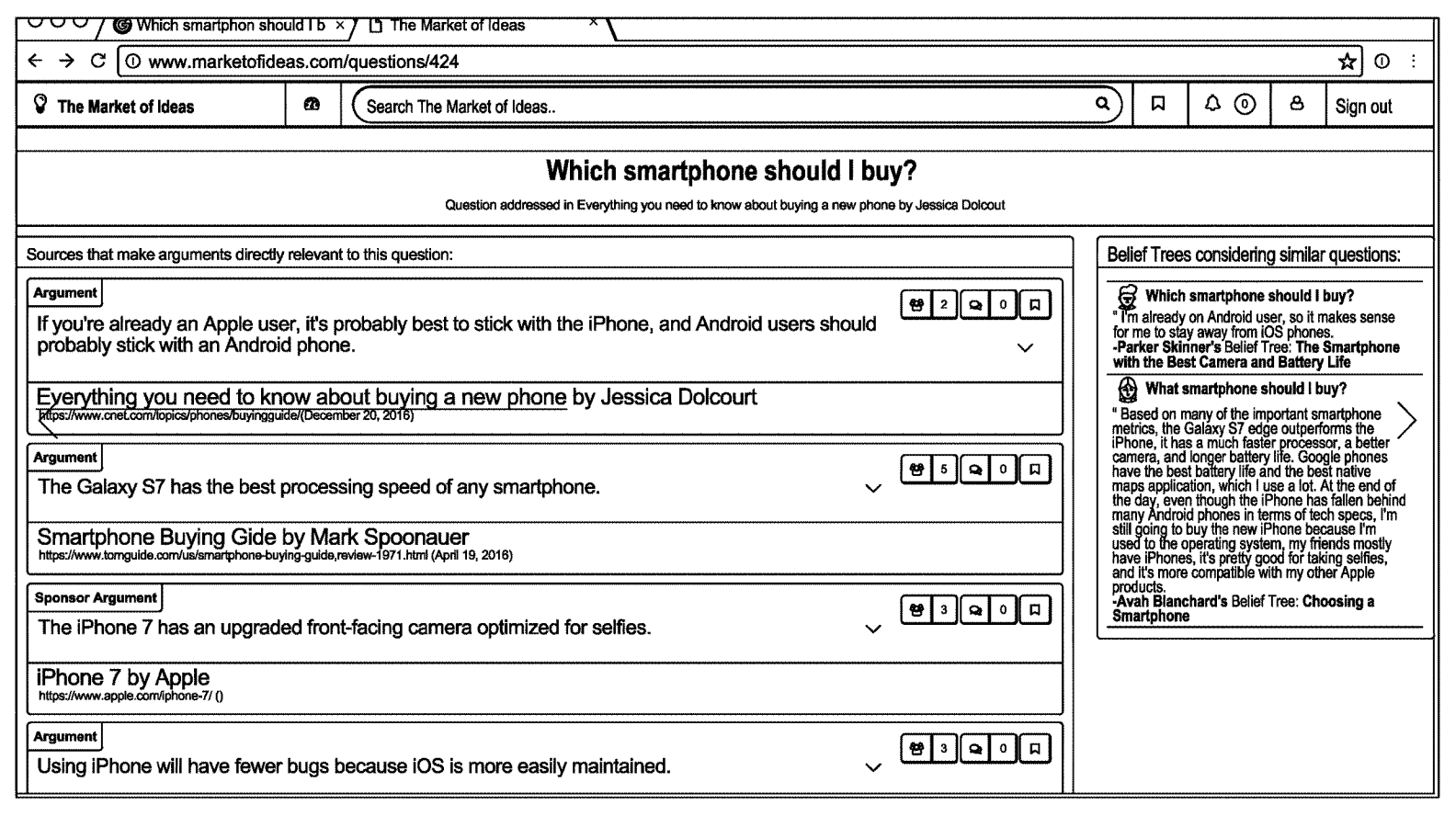

Performing logical aggregation 60 within the social networking system 1000 on the same question causes a keyword search of the questions in the database 1090, allows the user to select a relevant or interesting question for the list of questions returned from the keyword search, and returns the arguments that are found in similar questions, such as: 1) if you're already an Apple user, it's probably best to stick with the iPhone; 2) The Galaxy S7 has the best processing speed of any smartphone; 3) the iPhone 7 has an upgraded camera that is optimized for selfies; 4) the iPhone has fewer bugs and is more easily maintained. FIG. 15 illustrates example logical aggregation search results.

Figure 17:
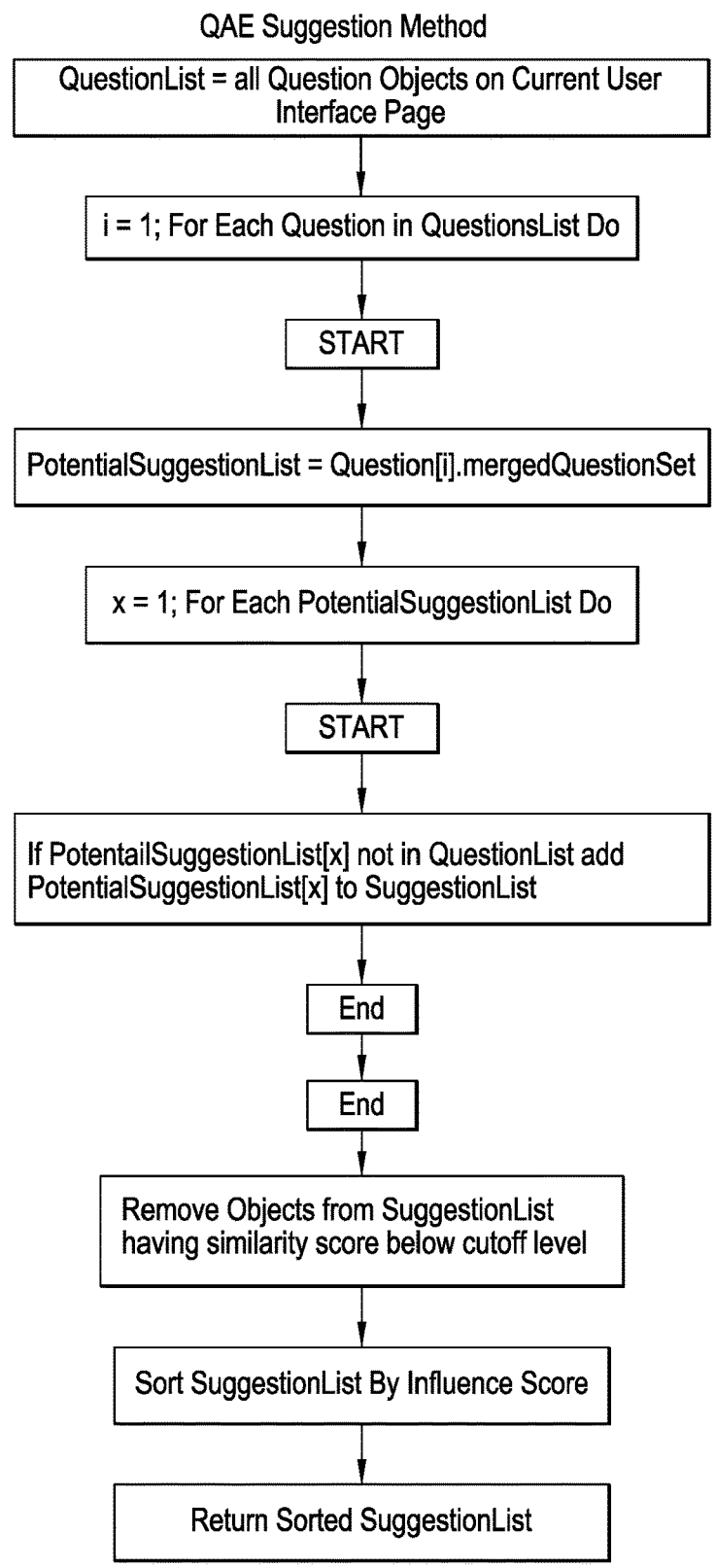
FIG. 17 is a block diagram illustrating the QAE Suggestion process.

The third type of search and suggestion is the QAE Suggestion method 70, illustrated in FIG. 17, which suggests QAE Structures 10 that may be influential to a user based on a question or group of questions that the user has considered, i.e. has created, saved or searched, etc. The QAE Suggestion method 70 identifies a question or set of questions that a user is considering or has considered by searching the currently active user interface page 1010 for question objects 22, such as the question objects 22 that are found in a belief tree 30 or a question object that has been or is being constructed in the QAE Structure creation interface page 1040, and adds all such question objects 22 to a list of question objects 72.

The QAE suggestion method 70 iterates through the list of question objects 72 and for each question object 22 in the list 72 the method 70 iterates through the question object's 22 merged question object list 22d and, if the linked question object 28b is not already in the list 72, it is added to a suggestion list 74.

The suggestion method 70 sorts the suggestion list 74 in the same manner as the logical aggregation search method 60. More specifically, the method 70 removes question objects from the suggestion list 74 having a similarity measure 28c that is below a cutoff level 76. The cutoff level 76 may be defined in a number of ways. For example, the cutoff level may be set to reject the lowest 25% of similar questions. Or, it may be set based on the number of similar questions, i.e. it may reject the bottom 25% if there are fewer than 100 similar questions, or the bottom 50% if there are more than 100 similar questions. The method 70 then sorts the list 74 by influence scores 22c, i.e. listing the question object 22 with the highest influence score 22c first, and returns the sorted list 74 to the user.

The structure of the data also enables a Socratic dialogue method of commenting 80 on others QAE structures 10 and/or belief trees 30. Users may post their work, i.e. QAE Structures, belief trees, etc., to the social networking system 1000 where the general public and/or the friends/followers to whom they have granted specific access may view their work. The Socratic dialogue method 80 allows users to post questions 12 for consideration or discussion on any argument 14 or evidence 16 in a QAE structure 10 or a belief tree 30 that others have published. Then users merge QAE structures 10 into the posted question 12 to provide a substantiated answer to the question 12. Socratic dialogue 80 and the QAE Structure 10 generally forces users to have constructive, narrowly focused, and evidence based dialogue that ultimately helps all users construct more informed beliefs.

As previously mentioned, FIGS. 1 and 2 illustrate the social networking system 1000, and in particular an overview of the system architecture. In the embodiment shown, the system environment comprises one or more client devices D, the social networking system 1000, and a network 1200. Although only three client devices 20 are shown it is understood that thousands or more client devices D may be coupled to the social networking system 1000 via the network 1200.

The client devices D include one or more computing devices that are able to receive user input and transmit and receive data via the network 1200. The client device may be a conventional computer system having an operating system such as Microsoft Windows, Apple OS X, or a Linux distribution. The client device may also be a mobile device such as a smart-phone, tablet, or personal digital assistant. The client devices D are configured to communicate via the network 1200 and execute an application such a as web browser that allows a user of the client device D to interact with the social networking system 1000. The client device may also interact with the social networking system 1000 through an application programming interface that operates on a native operating system such as iOS or DROID.

The network 1200 may use any number of standard communication technologies, such as, for example, Ethernet, 802.11, 3G and/or 4G, digital subscriber lines, etc. Similarly, the network 1200 may use any number of standard communication protocols, such as, for example, transmission control protocol/internet protocol (TCP/IP), simple mail transfer protocol (SMTP), file transfer protocol (FTP), and/or the hypertext transport protocol (HTTP). The data being exchanged over the network 1200 may be represented using known technologies, such as hypertext markup language (HTML), and/or the extensible markup language (XML). A webserver 1220 links the social networking system 1000 via the network 1200 to the client devices D, and provides the functionality for receiving and routing messages between the social networking system 100 and the client devices D.

It is understood that the embodiments described herein are merely illustrative of the present invention. Some portions of this describe the invention in terms of algorithms and flowcharts. These types of descriptions and representations are commonly used by those skilled in the software and data processing arts to convey the substance of their work to others of similar skill, and are understood to be implemented by computer programs or equivalent electrical circuits or the like. The described methods and processes may be, embodied in software, firmware, hardware, or any suitable combination thereof.

Variations in the construction of the social media network may be contemplated by one skilled in the art without limiting the intended scope of the invention herein disclosed and as defined by the following claims.

What is claimed is:

1. A computer-implemented method comprising the steps of:
   accessing a data store containing a plurality of data store question objects, a plurality of data store argument objects, and a plurality of data store evidence objects, the data store question objects having a list of associated data store argument objects, the data store argument objects having a list of associated data store evidence objects;
   generating a first social networking system interface that comprises windows and buttons for creating a belief tree, for adding belief tree question objects to the belief tree, for viewing the data store question objects, for viewing the data store argument objects, for viewing the data store evidence objects, and for merging one or more of the data store question objects into the belief tree question object;
   receiving one or more requests from a user to merge one or more data store question objects into the belief tree question object;
   in response to receiving the request to merge one or more data store question objects into the belief tree question object, merging the one or more data store question objects into the belief tree question object and displaying the belief tree question object in the first social networking system interface window;

saving the belief tree question object in the data store.

2. The computer-implemented method of claim 1, wherein the first social networking system interface includes a search window, and wherein entering search terms into the search window returns a list of question objects having one or more question objects having similar keywords to the search terms, the list of question objects displayed to the user in the first social networking system interface, the first social networking system interface further comprising an option to merge the question objects in the list of question objects into the belief tree question object.

3. The computer-implemented method of claim 1, wherein each of the plurality of data store question objects include a text string, an influence score, and a merged question set, the merged question set capable of storing one or more merged question objects, each merged question object having a first question link, a second question link and a similarity measure.

4. The computer-implemented method of claim 3, further comprising the steps of:

providing a logical aggregation search window in the first social networking system interface;

receiving search terms in the logical aggregation search window;

in response to receiving search terms in the logical aggregation search window performing a keyword search of the data store question objects and adding the data store question objects from the keyword search to a similar question list, the similar question list displayed in the first social networking system interface;

receiving from the user a selected question object from the similar question list;

in response to receiving the selected question object, adding all question objects that the selected question object has been merged with to a suggested question list;

sorting the suggested question list;

displaying the suggested question list in the first social networking system interface.

5. The computer-implemented method of claim 4, wherein sorting the suggested question list includes the steps of:

removing all question objects having a similarity measure below a cutoff level from the suggested question list;

sorting the suggested question list by influence score.

6. The computer-implemented method of claim 5, wherein the argument objects associated with the question objects in the suggested question list are displayed to the user in the first social networking system interface.

7. The computer-implemented method of claim 6, wherein each argument object has a set of merged argument objects, and wherein each merged argument object has a first merged argument object, a second merged argument object, and a similarity measure, and wherein the argument objects associated with the question objects in the suggested question list are grouped by the merged argument object's similarity measure.

8. The computer-implemented method of claim 3, further comprising the steps of:

searching the first social networking system interface for question objects and adding each question object found in the first social networking system interface to a question object list;

adding each question object that the question objects in the question object list have been merged with to a suggested question list;

displaying the suggested question list in the first social networking system interface.

9. The computer-implemented method of claim 8, wherein the question objects in the suggested question list having a merged question object having a similarity measure below a cutoff level are removed from the suggested question list.

10. The computer-implemented method of claim 9, wherein the suggested question list is sorted by the question object's influence score.

11. The computer implemented method of claim 3, wherein merging the one or more data store question objects into the belief tree question object adds the data store question object's list of argument objects to, the belief tree question object's list of argument objects.

12. The computer-implemented method of claim 11, further comprising the steps of:

checking the data store question object's merged question set to determine whether the data store question object has been merged before;

upon determining that the data store question object has not been merged before, creating a merged question object having a first question object, a second question object, and a similarity measure, and adding the data store question object to the first question object, adding the belief tree question object to the data store question object, and setting the similarity measure to an initial value;

upon determining that the data store question object has been merged before, checking each question object in the data store question object's merged data set to determine if the data store question object and the belief tree question object have been merged before;

upon determining that the data store question object and the belief tree question object have been merged before, incrementing the merged question objects similarity measure;

upon determining that the data store question object and the belief tree question object have not been merged before, creating a merged question object having a first question object, a second question object, and a similarity measure, and adding the data store question object to the first question object, adding the belief tree question object to the data store question object, and setting the similarity measure to an initial value;

saving the merged question object to the data store.

13. The computer-implemented method of claim 3, wherein the first social networking system interface enables a user to merge a first argument object with a second argument object.

14. The computer-implemented method of claim 13, wherein each argument object includes an argument text string and a set of merged argument objects, each merged argument object including a first merged argument object, a second merged argument object, and a merged argument similarity measure, and wherein merging a first argument object with a second argument object checks to determine whether the first argument object has been merged with the second argument object and wherein upon determining that the first argument object and second argument have been merged before incrementing the merged argument objects similarity measure and upon determining that the first argument object and second argument object have not been merged before creating a new merged argument object having a first merged argument object with a copy of the first argument object, a second merged argument object with a copy of the second merged argument object, and a similarity measure that is set to an initial value.

15. The computer-implemented method of claim 1, wherein a second social networking system interface is provided for display to a viewing user of other users' belief trees and other users question objects, and wherein the second social networking system interface has dialogue windows for posting questions to the other users question objects, argument objects and evidence objects.

16. The computer-implemented method of claim 15, wherein the second social networking system interface allows the viewing user to merge new question objects into the other users question objects.

17. The computer-implemented method of claim 1, wherein the first social networking system interface includes dialog windows for ranking the question objects, argument objects, and evidence objects.

18. The computer-implemented method of claim 1, wherein the first social networking system interface includes a dialog box for entering a belief summary.

* * * * *